Figure 3:
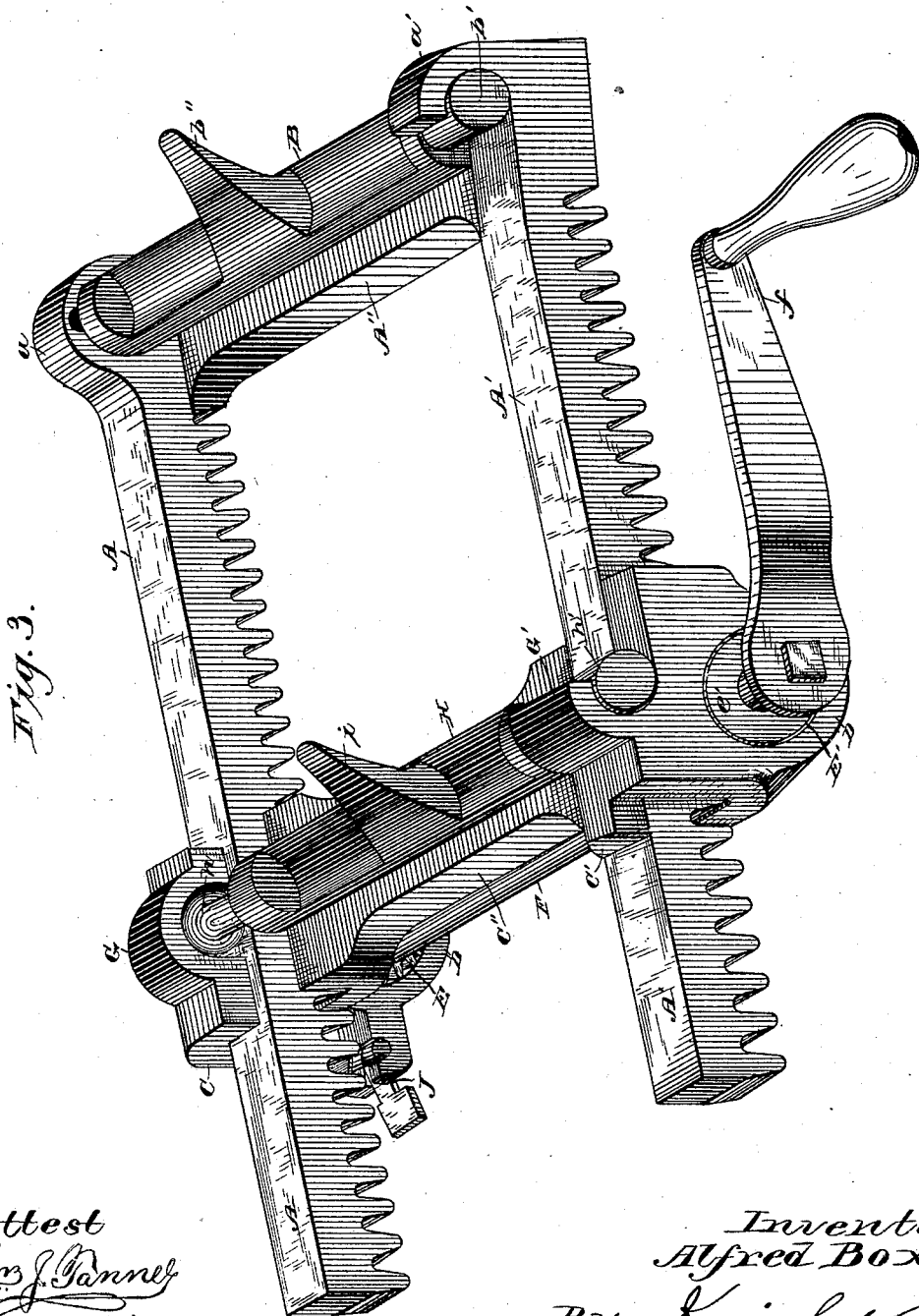

(Model.)
3 Sheets—Sheet 1.
A. BOX.
BELT TIGHTENER.
No. 283,856. Patented Aug. 28, 1883.
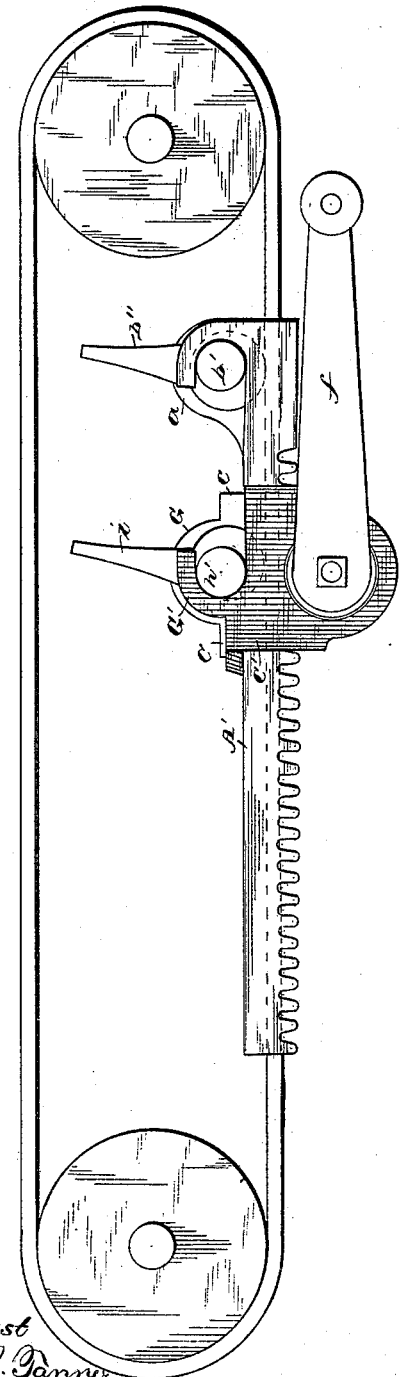
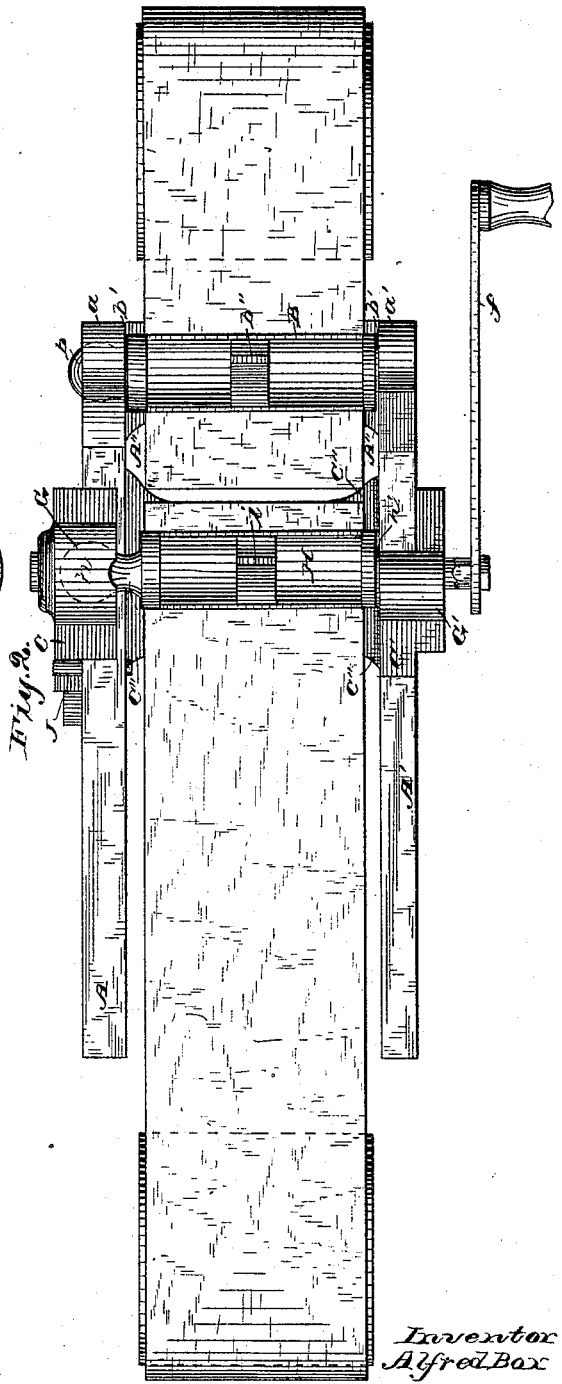
Attest
Herbert Knight
Inventor
Alfred Box
By Knight Bros.
Attys (Model.)

3 Sheets—Sheet 2.

A. BOX.
BELT TIGHTENER.

No. 283,856. Patented Aug. 28, 1883.

Attest
Wm. J. Tanner
Herbert Knight

Inventor
Alfred Box
By Knight Bros
Atty§

(Model.)
3 Sheets—Sheet 3.
A. BOX.
BELT TIGHTENER.
No. 283,856.
Patented Aug. 28, 1883.
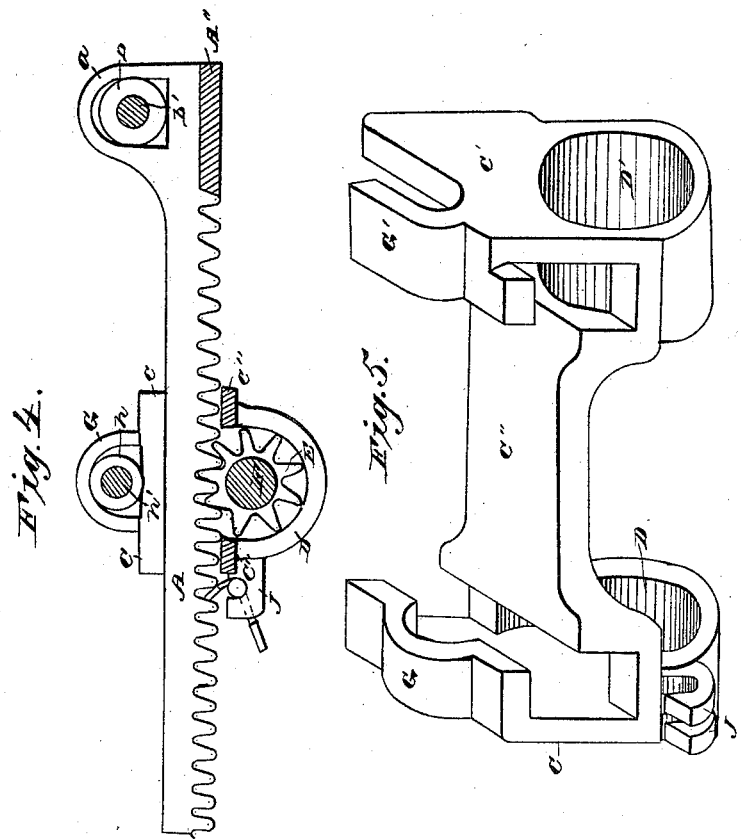
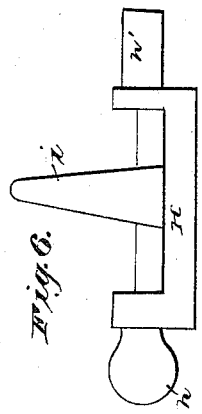
Attest
Wm. J. Danner
Herbert Knight
Inventor
Alfred Box
By Knight Bros
Attys

UNITED STATES PATENT OFFICE.

ALFRED BOX, OF PHILADELPHIA, PENNSYLVANIA.

BELT-TIGHTENER.

SPECIFICATION forming part of Letters Patent No. 283,856, dated August 28, 1883.

Application filed January 30, 1883. (Model.)

*To all whom it may concern:*

Be it known that I, ALFRED BOX, of the city and county of Philadelphia, in the State of Pennsylvania, have invented a new and useful Improvement in Belt-Tighteners or Clamps for Taking up the Slack in Belts, of which the following is a specification.

The subject of my invention is a toothed frame made of malleable iron or other suitable metal, having on its edges or sides teeth into which mesh two pinions, to which is attached a movable or sliding head adapted to travel parallel with the said frame, and provided with two eccentric or cam rollers to automatically clamp and hold the belt in place, while the ends are drawn together by the racks and pinions, and insuring the correct pulling of the belt at all times.

To enable those skilled in the art to which my invention relates to make and use the same, I will proceed to describe it more particularly, reference being had to the accompanying drawings, in which—

Figure 1 is a front elevation of the device, showing the belt in position. Fig. 2 is a plan view. Fig. 3 is a perspective view, representing the frame with teeth cut on its under side. Fig. 4 is a section view, showing the rack and pinion. Fig. 5 is the sliding head removed. Fig. 6 is a cam removed.

In the figures, A A' represent the rack-bars of the frame, near one end of which are cast journals $a\,a'$. The journal $a$ is of socket form, while $a'$ is open, and together they form the bearing-surfaces for the cam or eccentric roller B.

Beneath the journals $a\,a'$ is a connecting-bar, A'', for rigidly attaching the rack-bars to each other, and serving, also, in connection with the cam B, as a guide or clamp for holding the belt, as hereinafter more fully described. I prefer to make the cam B as light as possible, as in this case it will the more effectually perform its office. The end $b$ of cam B, which journals in the socket $a$, is ball-shaped, and a narrow neck forms the connection between $b$ and a shoulder of the cam B. The end $b'$ of the cam turning in the journal $a'$ is a plain spindle. At $b''$ is a small lever-handle, by which the cam can be turned, if necessary, to clamp or loosen the belt. These rollers may be smooth, as shown in the drawings, or they may be corrugated or be provided with several pointed teeth, by which means a greater hold or grip on the belt can be obtained.

C C' are two sliding heads, connected together by rigid beam C'', and moving upon the rack-bars A A', by means of which the belt is drawn tight. The sliding heads C C' are provided on their under sides with two journal-receptacles, D D'. The diameter of these receptacles are identical with the diameters of the pinion-wheels E E' which move therein, so that the said pinion-wheels E E', with their exterior flanges, $e\,e'$, can easily revolve, and at the same time fill the receptacles, thereby preventing any shaking of the said pinion-wheels. These pinion-wheels are also provided with a connection-shaft, F, which establishes a uniform movement between the same. The pinion-wheels E E', with their flanges $e\,e'$ and the shaft F, are preferably cast in one piece. The rack-cars A A' move in openings of the sliding heads C C' and mesh with the pinion-wheels E E'. The latter may be operated by a handle, $f$, or where more power is required I employ a worm or screw.

Upon the sliding heads C C' are cast journals G G', similar to $a\,a'$, for the reception of the cam or eccentric roller H. The journal G, like the journal $a$, is socket form, to correspond with the ball $h$ of the cam H, which revolves therein. The spindle $h'$ is similar to the spindle $b'$, and turns in a like journal.

The cam H is also provided with a lever, $i$, by means of which it can be easily operated, if necessary. In connection with the beam C'' a guide is formed for the belt drawn from that end.

A breaking device is shown at J to prevent the mechanism shifting when it is set at the desired place.

By means of the ball-and-socket joint, as shown in Fig. 3, the cams will turn automatically and press against the belt when the apparatus is operated. At the same time, when it is desired, the tightener can be placed on an endless belt by lifting the spindle ends of the cams without cutting or removing the belt from the pulleys, and after drawing the belt up the desired amount it can be cut and relaced.

Having thus described my invention, the fol- lowing is what I claim as new therein and desire to secure by Letters Patent:

1. A belt-tightener having means for automatically clamping a belt in two places, and provided with mechanism, substantially as described, whereby the said belt may be drawn up, cut, and relaced without removing it from its pulleys.

2. In a belt tightener or clamp, a double rack and pinion-wheels, as and for the purposes set forth.

3. In a belt-tightener, the combination, with the double rack and pinion-wheels, of the sliding head and clamping device, substantially as set forth.

4. In a belt-tightener, the combination of the sliding head and revolving cam, having a ball-and-socket joint, and spindle bearing in an open journal, as and for the purposes set forth.

5. In combination with the sliding head having pinion-wheels meshing in a double rack, and a clamping device for holding the belt, of a second clamp for holding one end of the belt to be sewed while the other is drawn toward it.

ALFRED BOX.

Witnesses:
A. L. DORMON,
HENRY ERRIC.